(12) United States Patent
Tanaka et al.

(10) Patent No.: US 8,750,679 B2
(45) Date of Patent: Jun. 10, 2014

(54) INFORMATION PROCESSING APPARATUS, RECORDING METHOD, AND COMPUTER PROGRAM

(75) Inventors: Hisao Tanaka, Tokyo (JP); Noboru Oya, Kanagawa (JP)

(73) Assignee: Sony Corporation (JP)

( * ) Notice: Subject to any disclaimer, the term of this patent is extended or adjusted under 35 U.S.C. 154(b) by 1070 days.

(21) Appl. No.: 12/231,800

(22) Filed: Sep. 5, 2008

(65) Prior Publication Data

US 2009/0067819 A1  Mar. 12, 2009

(30) Foreign Application Priority Data

Sep. 10, 2007 (JP) ................ P2007-233878

(51) Int. Cl.
*H04L 29/06* (2006.01)

(52) U.S. Cl.
USPC ............ 386/247; 386/231; 386/240; 386/294

(58) Field of Classification Search
USPC .................................. 386/191, 192, 194, 195
See application file for complete search history.

(56) References Cited

U.S. PATENT DOCUMENTS

| 7,401,174 | B2 * | 7/2008 | So et al. ............................. 711/4 |
| 2004/0252980 | A1 * | 12/2004 | Watanabe ....................... 386/96 |
| 2005/0069292 | A1 | 3/2005 | Yokota et al. |
| 2006/0155920 | A1 * | 7/2006 | Smith et al. ................... 711/103 |
| 2006/0206912 | A1 * | 9/2006 | Klarfeld et al. ................ 725/40 |
| 2007/0143566 | A1 * | 6/2007 | Gorobets ....................... 711/202 |
| 2008/0155175 | A1 * | 6/2008 | Sinclair et al. ................ 711/103 |
| 2010/0223423 | A1 * | 9/2010 | Sinclair et al. ................ 711/103 |

FOREIGN PATENT DOCUMENTS

| JP | 64-051868 | A | 2/1989 |
| JP | 5-313961 | A | 11/1993 |
| JP | 08-339318 | | * 12/1996 |
| JP | 8339318 | | 12/1996 |
| JP | 10-063441 | A | 3/1998 |
| JP | 11-003346 | A | 1/1999 |
| JP | 11-096730 | A | 4/1999 |
| JP | 2001-218153 | A | 8/2001 |
| JP | 2002-084495 | A | 3/2002 |
| JP | 2002-084499 | A | 3/2002 |
| JP | 2004-086823 | A | 3/2004 |
| JP | 2004-192500 | A | 7/2004 |
| JP | 2005-202942 | A | 7/2005 |
| JP | 2006-129081 | A | 5/2006 |
| JP | 2006-164017 | A | 6/2006 |
| WO | 2004057610 | | 7/2004 |

OTHER PUBLICATIONS

European Search Report, EP 08 16 3970.

* cited by examiner

*Primary Examiner* — Michael Simitoski
*Assistant Examiner* — Gary Lavelle
(74) *Attorney, Agent, or Firm* — Lerner, David, Littenberg, Krumholz & Mentlik, LLP

(57) ABSTRACT

There is provided an information processing apparatus which records data in a recording medium including: a recording section which records data in the recording medium; a detecting section which detects continuous or fragmented free areas in minimum allocation unit of the recording medium; and a recording control section which controls the recording section so that the recording section sequentially records data in the continuous free areas of the recording medium detected by the detecting section, and at the time point when the recording is completed, the recording section moves an end portion of the recorded data to the fragmented free areas of the recording medium detected by the detecting section so as to be recorded.

13 Claims, 9 Drawing Sheets

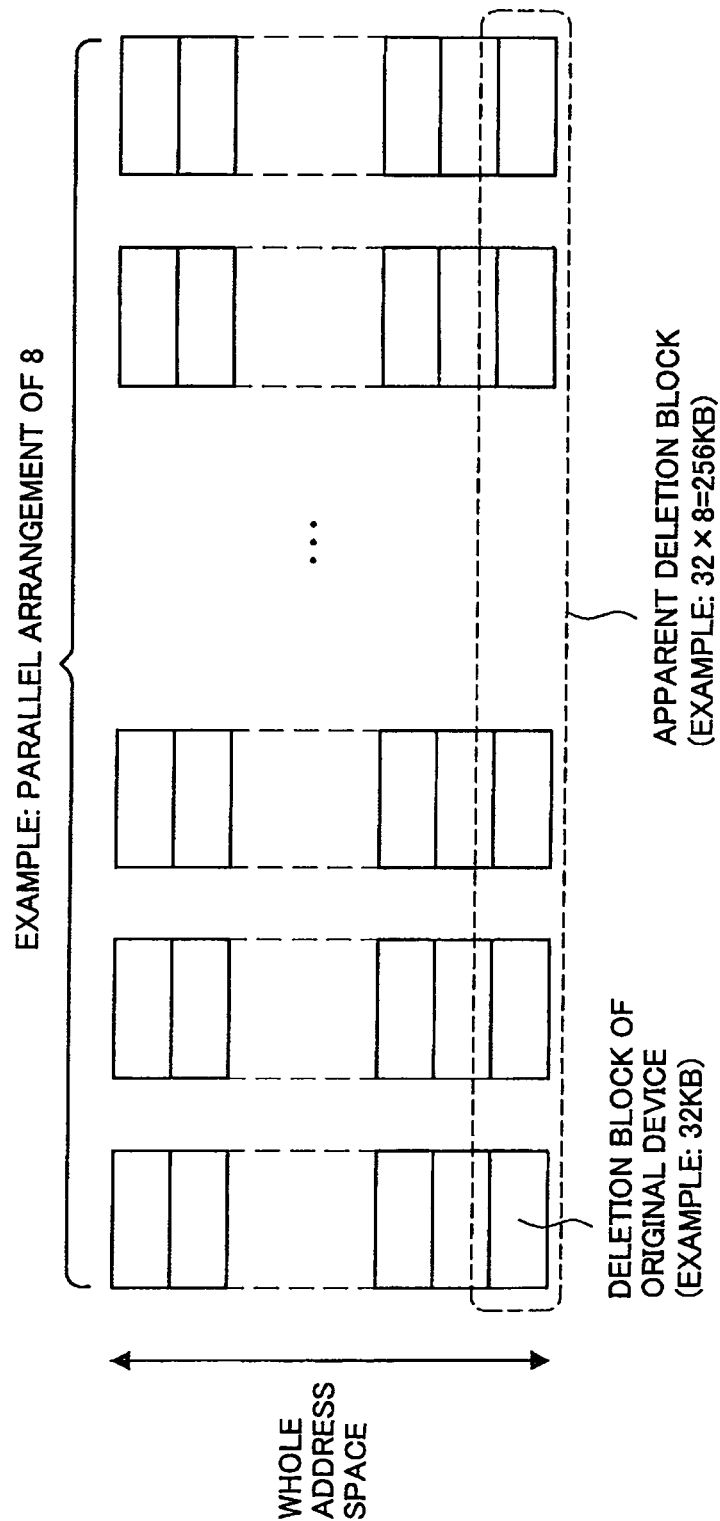

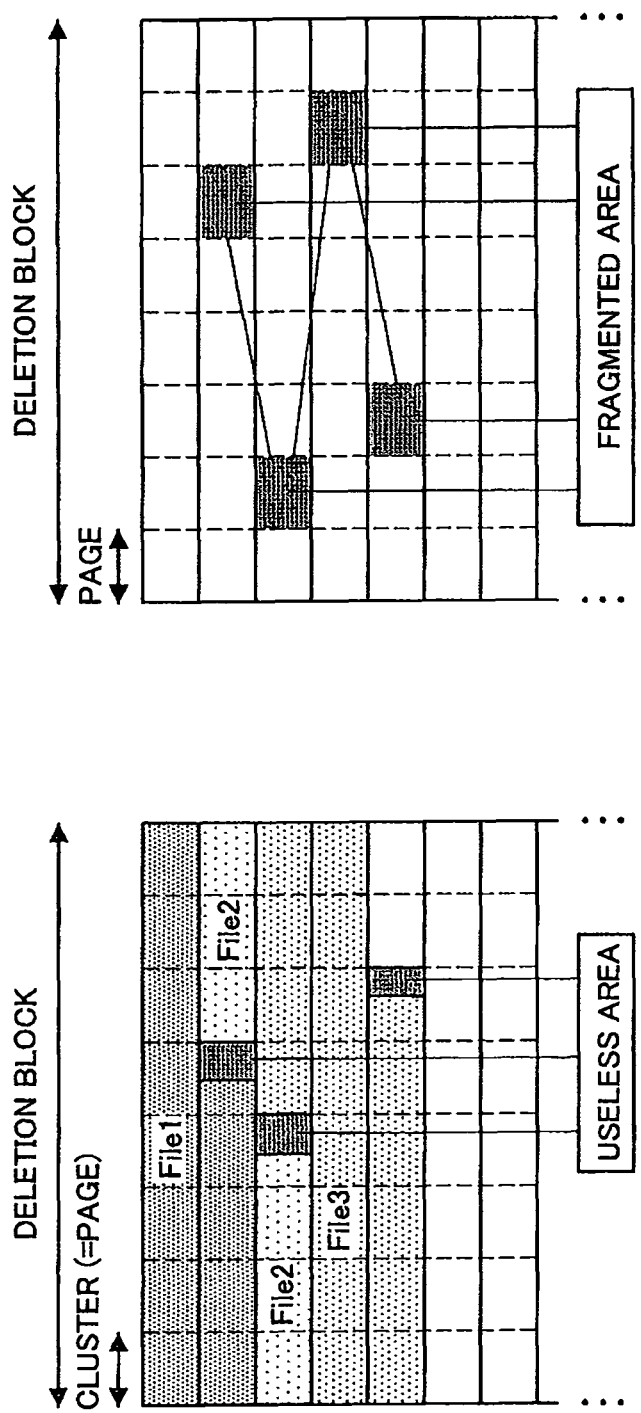

INFORMATION PROCESSING APPARATUS, RECORDING METHOD, AND COMPUTER PROGRAM

CROSS-REFERENCE TO RELATED APPLICATION

The present application claims priority from Japanese Patent Application No. JP 2007-233878, filed in the Japanese Patent Office on Sep. 10, 2007, the entire content of which is incorporated herein by reference.

BACKGROUND OF THE INVENTION

1. Field of the Invention

The present invention relates to an information processing apparatus, a recording method and a computer program. More specifically, the invention relates to the information processing apparatus, the recording method and the computer program which record data in a recording medium in unit of file.

2. Description of the Related Art

Nonvolatile semiconductor memories represented by flash memories are being miniaturized and their capacity are being enlarged, and thus they are frequently used for recording high-capacity data such as video data and audio data.

In general, flash memories have reading/writing unit which is called as a page and data deletion unit which is called as deletion block. A size of the deletion block is an integral multiple of a page size. For example, the page size can be 2 Kbytes, and the size of the deletion block can be 32 Kbytes corresponding to 16 times larger than the page size. FIG. 6 is an explanatory diagram illustrating a relationship between the deletion block and the page in the flash memory.

The flash memories should delete data prior to writing of data. When, therefore, data is rewritten in the flash memory, after data is deleted in unit of deletion block, data is written in unit of page. That is to say, a rewriting unit of the flash memories is a deletion block. In most of the flash memories to be used as removal devices, rewriting is enabled in unit of page in a pseudo-manner. In these devices, however, data is internally saved and restored so that the rewriting in unit of page is realized. In general, the rewriting in unit of page causes a reduction in a recording speed because the internal processes such as saving and restore are executed.

In the flash memories, as capacity is made to be higher, a data access is further sped up. A plurality of flash memories in parallel is used inside the device, so that speeding-up of the data access can be realized. For example, when eight flash memories are arranged in parallel, an eightfold access speed can be obtained by simple arithmetic.

On the other hand, when the flash memories in parallel are used, the apparent size of the pages and the size of the deletion block increase. FIG. 7 is an explanatory diagram explaining a case where the flash memories in parallel are used. For example, when eight flash memories, where the size of the page is 2 Kbytes and the size of the deletion block is 32 Kbytes, are arranged in parallel, the apparent sizes of the page and the deletion block become 16 Kbytes and 256 Kbytes respectively which are 8 times as large. When the data access is sped up hereafter, the size of the deletion block also increases according to the speeding-up.

In file systems such as FAT (File Allocation Table), data is allocated to a recording medium in unit of allocation called as cluster including a plurality of sectors. In this case, the size of cluster is set desirably so as to be an integral multiple of the size of the deletion block (at least, the same size) according to characteristics of the flash memories. When the size of the cluster is not an integral multiple of the size of the deletion block, the deletion block is shared by adjacent clusters. In this case, however, when a certain cluster is reused (not in unit of deletion block), rewriting in unit of page is carried out, and a processing speed is lowered.

When the size of the deletion blocks increases according to the speeding-up, therefore, the size of the clusters is desirably increased. In order to obtain the effect of parallelization, data should be accessed in unit of apparent page. When data is accessed in unit smaller than unit of apparent page, the effect of parallelization is not produced.

SUMMARY OF THE INVENTION

When the size of the clusters is an integral multiple of the deletion blocks, however, useless areas in which data is not recorded increase. FIGS. 8A and 8B are explanatory diagrams explaining recording of data in a past flash memory when the size of clusters is set to be the same as the size of the deletion blocks. FIG. 8A illustrates a structure of the flash memory, and 8 pages form a deletion block here. FIG. 8B illustrates recording of data (file) in the flash memory in the case where the size of the clusters is set to be the same as the size of the deletion blocks.

In the file system which carries out allocation in unit of cluster, at most less than one cluster of useless area is generated for one file, and averagely ½ cluster of useless area is generated. Accordingly, when the size of the clusters is set to be the same as the size of the deletion block, averagely ½ deletion block of useless area is generated for one file.

On the other hand, when the size of the cluster is set to be the same as the size of the page, averagely ½ page of useless area is generated for one file, and thus the size of the useless area is smaller, compared with the case when the size of the cluster is set to be the same as the size of the deletion block. However, as generation and deletion of files are repeated, a recording area is fragmented in unit of page, and thus a rate of recording and reproducing data is possibly reduced. FIGS. 9A and 9B are explanatory diagrams explaining the recording of data in a past flash memory in the case where the size of the cluster is set to be the same as the size of the page.

As shown in FIG. 9A, when the size of the cluster in the flash memory is set to be the same as the size of the page, useless areas are further decrease compared with the case when the size of the cluster is set to be the same as the size of the deletion block. As shown in FIG. 9B, however, as the generation and deletion of the file are repeated, the recording area in the flash memory is fragmented in unit of page, and thus the rate of recording and reproducing data decreases. As described above, rewriting in the flash memory in unit of page causes a reduction in the recording speed.

The present invention is devised in order to solve the above issue, and it is desirable to provide new and improved information processing apparatus, recording method and computer program which arrange and record data so that fragmentation of a free area decreases at the time of recording in a recording medium so as to be capable of reducing a useless area with the fragmentation being repressed.

According to an embodiment of the present invention, there is provided an information processing apparatus including: a recording section which records data in the recording medium; a detecting section which detects continuous free areas or fragmented free areas in a minimum allocation unit of the recording medium; and a recording control section which controls the recording section so that the recording section successively records data in the continuous free areas of the recording medium detected by the detecting section, and at the time point when the recording is completed, the control section moves an end portion of the recorded data to the fragmented free areas of the recording medium detected by the detecting section so as to record the data.

According to such a constitution, the recording section records data in the recording medium and the detecting section detects the continuous or fragmented free areas in minimum allocation unit of the recording medium. The recording control section controls the recording section so that the recording section successively records data in the continuous free areas of the recording medium detected by the detecting section, and at the time point when the recording is completed, the recordation control section moves an end portion of the recorded data to the fragmented free areas of the recording medium detected by the detecting section so as to record the data. As a result, the fragmented free areas are filled with the data, and thus while the fragmentation of the recording medium is being repressed, useless areas can be reduced. The movement of the end portion of the data reduces the entire speed, but since only the end portion is moved after the recording is completed, the recording is not failed by the lowering of the speed.

The data to be recorded in the recording medium is video and audio data, and the recording section may allocate the video and audio data to the recording medium in unit of clip so as to record them. According to such a constitution, the video and audio data is recorded in the recording medium, and the recording section allocates the video and audio data in clip unit to the recording medium so as to record them. After the recording is completed, the data recorded in the end portion of the allocation area are moved to the fragmented recording medium so as to be recorded. As a result, generation of useless areas is repressed, partially free deletion blocks are eliminated, and the number of completely free deletion blocks can be increased.

The recording section may allocate data defined at the time of starting the recordation just before the video and audio data so as to record it, and may allocate data defined at the time of completing the recordation just after the video and audio data so as to record it. As a result, the data defined at the time of starting the recordation and the data defined at the time of completing the recordation are allocated continuously with the video and audio data so as to be recorded therein. As a result, the generation of partially free blocks is repressed, and these data is deleted simultaneously with the deletion of the video and audio data. For this reason, generation of fragments can be repressed.

According to another embodiment of the present invention, there is provided an information processing apparatus including: a recording section which records data in the recording medium; a data storage section which temporarily stores the data to be recorded in the recording medium therein before the recording section records the data in the recording medium; a detecting section which detects continuous free areas or fragmented free areas in a minimum allocation unit of the recording medium; and a recording control section which controls the recording section so that the recording section sequentially moves the data stored in the data storage section to the continuous free areas of the recording medium detected by the detecting section so as to record them during normal recording, and moves a recording end portion of the data recorded in the data storage section to the fragmented free areas of the recording medium detected by the detecting section so as to record them during normal recording.

According to such a constitution, the recording section records data in the recording medium and the data storage section temporarily stores the data to be recorded in the recording medium therein before the recording section records the data in the recording medium. The detecting section detects continuous free areas or fragmented free areas in a minimum allocation unit of the recording medium. The recording control section controls the recording section so that the recording section sequentially moves the data stored in the data storage section to the continuous free areas of the recording medium so as to record them during normal recording, and moves only a recording end portion of the data recorded in the data storage section to the fragmented free areas of the recording medium so as to record them. As a result, when recording in the recording medium, the data temporarily stored in the data storage section are moved to the fragmented free areas and recorded, so that useless areas can be reduced while the fragmentation of the recording medium is being repressed.

The data to be recorded in the recording medium is video and audio data, and the recording control section may control the recording section so that the recording section allocates the video and audio data to the recording medium in unit of clip so as to record them. According to such a constitution, the video and audio data is recorded in the recording medium, and the recording section allocates the video and audio data to the recording medium in unit of clip so as to record them. During the normal recording, the video and audio data stored in the data storage section are sequentially allocated in unit of clip to the continuous free areas of the recording medium so as to be recorded, and the end portion of the data stored in the data storage section is allocated and moved in unit of clip and moved to the fragmented free areas of the recording medium so as to be recorded. As a result, by recording the video and audio data in the recording medium so as to fill the fragmented free areas in unit of clip, the generation of useless areas can be repressed, and partially free deletion blocks can be eliminated. Further, the number of the completely free deletion blocks can be increased.

The recording section may allocate data defined at the time of starting the recordation just before the video and audio data so as to record it, and may allocate data defined at the time of completing the recordation just after the video and audio data so as to record it. As a result, the data defined at the time of starting the recordation and the data defined at the time of end of the recording are allocated and recorded continuously with the video and audio data, so that the generation of partially free blocks can be repressed. Furthermore, when the video and audio data is deleted, these data is deleted simultaneously. For this reason, the generation of fragments can be repressed.

The data storage section may include at least one data storage block having the same capacity as a deletion block, which is a substantial rewriting unit of the recording medium. Further, the data storage section may store data in unit of page, which is a minimum reading/writing unit of the recording medium.

The data storage section may be included in the recording medium. As a result, implementation of the information processing apparatus becomes easy.

According to another embodiment of the present invention, there is provided a recording method for recording data in a recording medium, including the steps of: detecting continuous free areas or fragmented free areas in minimum allocation unit of the recording medium; controlling recordation so that data is recorded sequentially in the continuous free areas of the recording medium detected at the detecting step, and at the time point when the recording is completed, an end portion of the recorded data is moved to the fragmented free areas of the recording medium detected at the detecting step so as to be recorded; and recording data in the recording medium according to the control at the recordation controlling step.

According to such a constitution, at the detecting step, continuous free areas or fragmented free areas in minimum allocation unit of the recording medium are detected. At the recordation controlling step, a control is made so that data is recorded sequentially in the continuous free areas of the recording medium detected at the detecting step, and at the time point when the recording is completed, an end portion of the recorded data is moved to the fragmented free areas of the recording medium detected at the detecting step so as to be recorded. At the recording step, data is recorded in the recording medium according to the control at the recordation controlling step. As a result, when the fragmented free areas are filled with data, useless areas can be reduced while the fragmentation of the recording medium is being repressed. Although the entire speed may be reduced by the movement of the end portion of the data, since the end portion is moved after the recording is completed, the recording is not failed by the reduction in the speed.

According to another embodiment of the present invention, there is provided a recording method for recording data in a recording medium, including the steps of: temporarily storing data to be recorded in the recording medium before recording the data in the recording medium; detecting continuous or fragmented free areas in minimum allocation unit of the recording medium; controlling the recordation so that the data stored at the data storing step are sequentially moved to the continuous free areas of the recording medium so as to be recorded during normal recording, and only an end portion of the data stored at the data storing step is moved to the fragmented free areas of the recording medium detected at the detecting step so as to be recorded; and recording data in the recording medium according to the control at the recordation controlling step.

According to such a constitution, at the data storing step, data to be recorded in the recording medium are temporarily stored before the data is recorded in the recording medium. At the detecting step, continuous or fragmented free areas in minimum allocation unit of the recording medium are detected. At the recordation controlling step, a control is made so that the data stored at the data storing step are sequentially moved to the continuous free areas of the recording medium so as to be recorded, and only an end portion of the data stored at the data storing step is moved to the fragmented free areas of the recording medium detected at the detecting step so as to be recorded during normal recording. At the recording step, data is recorded in the recording medium according to the control at the recordation controlling step. As a result, when recording the data in the recording medium, the temporarily stored data is moved to the fragmented free areas and recorded therein, and thus the useless area can be reduced while the fragmentation of the recording medium is being repressed.

According to another embodiment of the present invention, there is provided a computer program which allows a computer to execute a process for recording data in a recording medium, including the steps of: detecting continuous free areas or fragmented free areas in minimum allocation unit of the recording medium; controlling recordation so that data is recorded sequentially in the continuous free areas of the recording medium detected at the detecting step, and at the time point when the recording is completed, an end portion of the recorded data is moved to the fragmented free areas of the recording medium detected at the detecting step so as to be recorded therein; and recording data in the recording medium according to the control at the recordation controlling step.

According to such a constitution, at the detecting step, continuous free areas or fragmented free areas in minimum allocation unit of the recording medium are detected, and at the recordation controlling step, recordation is controlled so that data is recorded sequentially in the continuous free areas of the recording medium detected at the detecting step, and at the time point when the recording is completed, an end portion of the recorded data is moved to the fragmented free areas of the recording medium detected at the detecting step so as to be recorded therein. At the recording step, data is recorded in the recording medium according to the control at the recordation controlling step. As a result, since the fragmented free areas are filled with data, useless areas can be reduced while the fragmentation of the recording medium is being repressed. Although the entire speed may be reduced by the movement of the end portion of data, since the end portion is moved after the recording is completed, the recording is not failed by the reduction in the speed.

According to another embodiment of the present invention, there is provided a computer program which allows a computer to execute a process for recording data in a recording medium, including the steps of: temporarily storing data to be recorded in the recording medium before recording the data in the recording medium; detecting continuous or fragmented free areas in minimum allocation unit of the recording medium; controlling recordation so that the data stored at the data storing step are sequentially moved to the continuous free areas of the recording medium so as to be recorded during normal recording, and only an end portion of the data stored at the data storing step is moved to the fragmented free areas of the recording medium detected at the detecting step so as to be recorded; and recording data in the recording medium according to the control at the recordation controlling step.

According to such a constitution, at the data storing step, data to be recorded in the recording medium are temporarily stored before recorded in the recording medium, and at the detecting step, continuous or fragmented free areas in minimum allocation unit of the recording medium are detected. At the recordation controlling step, a control is made so that the data stored at the data storing step are sequentially moved to the continuous free areas of the recording medium so as to be recorded during normal recording, and only an end portion of the data stored at the data storing step is moved to the fragmented free areas of the recording medium detected at the detecting step so as to be recorded. At the recording step, data is recorded in the recording medium according to the control at the recordation controlling step. As a result, when recorded in the recording medium, temporarily stored data is moved to the fragmented free areas and recorded therein, so that useless areas can be reduced while the fragmentation of the recording medium is being repressed.

According to the present invention, when data is recorded in the recording medium, the data is arranged and recorded so that the fragmentation of free areas is repressed. As a result, useless areas can be reduced while the fragmentation is being repressed. Reductions in a recording capacity and a recording rate of a recording medium can be reduced.

BRIEF DESCRIPTION OF THE DRAWINGS

FIG. 7 is an explanatory diagram explaining a case where flash memories arranged in parallel are used;

FIG. 9A is an explanatory diagram explaining recording of data in a past flash memory; and FIG. 9B is an explanatory diagram explaining recording of data in a past flash memory.

DETAILED DESCRIPTION OF THE PREFERRED EMBODIMENTS

Figure 1:
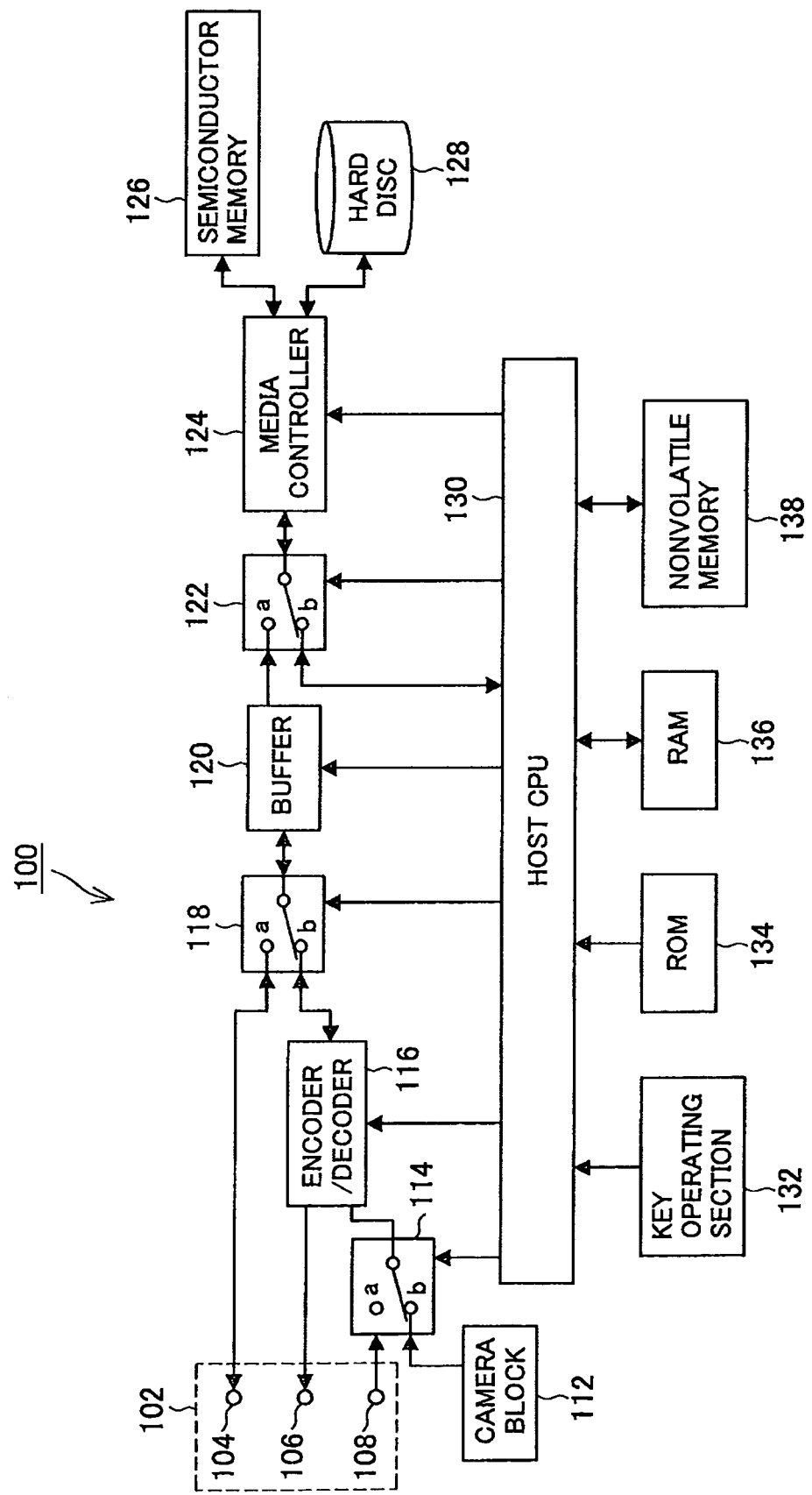
FIG. 1 is an explanatory diagram explaining an information processing apparatus 100 according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An information processing apparatus 100 according to one embodiment of the present invention is described. FIG. 1 is an explanatory diagram explaining the information processing apparatus 100 according to one embodiment of the present invention. The information processing apparatus 100 according to one embodiment of the present invention is described below with reference to FIG. 1.

As shown in FIG. 1, the information processing apparatus 100 according to one embodiment of the present invention includes an input/output section 102, a camera block 112, switch sections 114, 118 and 122, an encoder/decoder 116, a buffer 120, a media controller 124, a semiconductor memory 126, a hard disc 128, a host CPU 130, a key operating section 132, a ROM (Read Only Memory) 134, a RAM (Random Access Memory) 136, and a nonvolatile memory 138.

The input/output section 102 transmits/receives a signal to/from the external of the information processing apparatus 100. The input/output section 102 includes an input/output terminal 104, an output terminal 106, and an input terminal 108.

The input/output terminal 104 inputs/outputs a signal between the information processing apparatus 100 and another external apparatus such as a personal computer. Data such as text data and graphic data are input/output into/from another external apparatus, for example. The output terminal 106 outputs a signal to another external apparatus from the information processing apparatus 100. The input terminal 108 receives an input of a signal from another external apparatus such as a personal computer. For example, moving image information, still image information, and audio information are input from another external apparatus.

The camera block 112 converts moving image information and still image information acquired by photographing an object or audio information into digital data. The camera block 112 includes a lens, an image pickup device such as CCD (Charge Coupled Device) and CMOS (Complementary Metal Oxide Semiconductor), a microphone, an A/D converter and the like, which are not shown in figures.

The switch section 114 switches between an input from the input terminal 108 and an input from the camera block 112. The switch section 114 switches into one of a terminal a and a terminal b via the host CPU 130 according to an operation of the key operating section 132 by a user. When the switch section 114 is connected to the terminal a, an input from the input terminal 108 is input into the encoder/decoder 116. When the switch section 114 is connected to the terminal b, an input from the camera block 112 is input into the encoder/decoder 116.

The encoder/decoder 116 encodes the input from the input terminal 108 or the camera block 112 according to a predetermined encoding system such as MPEG (Moving Picture Motion Group), and outputs the encoded data. The encoder/decoder 116 decodes the encoded data accumulated in the buffer 120 according to a predetermined system, and supplies the decoded data to the output terminal 106.

The switch section 118 switches between input/output with the input/output terminal 104 and input/output with the encoder/decoder 116. The switch section 118 switches into one of the terminal a and the terminal b via the host CPU 130 according to the operation of the key operating section 132 by a user similar to the switch section 114. When the switch section 118 is connected to the terminal a, data is input/output with the input/output terminal 104. When the switch section 118 is connected to the terminal b, data is input/output with the encoder/decoder 116.

The buffer 120 temporarily stores data therein, and the writing of data into the buffer 120 and the reading of data from the buffer 120 are controlled by the host CPU 130. When data is recorded in the information processing apparatus 100, the data from the input/output terminal 104 or the encoder/decoder 116 is temporarily stored in the buffer 120 and then transmitted to the switch section 122. When the data recorded in the information processing apparatus 100 is read and reproduced, the data from the media controller 124 is temporarily stored in the buffer 120 via the switch section 122, and then transmitted to the switch section 118.

The switch section 122 switches into one of the terminal a and the terminal b via the host CPU 130. When data is recorded in the semiconductor memory 126 or the hard disc 128 or reads from the semiconductor memory 126 or the hard disc 128, the switch section 122 is connected to the terminal a. When data is recorded in the semiconductor memory 126 or the hard disc 128, the switch section 122 switches into the terminal b periodically, and the host CPU 130 updates information to be recorded in an information area provided to the semiconductor memory 126 or the hard disc 128.

A media controller 124 executes a recording process in a case where data is recorded in the semiconductor memory 126 or the hard disc 128, or executes a reading process in a case where data is read from the semiconductor memory 126 or the hard disc 128. When the media controller 124 executes the recording process, a free area of the semiconductor memory 126 or the hard disc 128 is detected, and data is recorded in the detected free area.

Various data are recorded in the semiconductor memory 126 or the hard disc 128. Data to be recorded in the semiconductor memory 126 and the hard disc 128 includes, for example, test data, graphic data, moving image information, still image information and audio information. The recording of data in the semiconductor memory 126 and the hard disc 128 is controlled by the media controller 124.

In this embodiment, data is recorded in the semiconductor memory 126 and the hard disc 128 according to an FAT (File Allocation Table) file system. In this embodiment, the semiconductor memory 126 is removable, and the hard disc 128 is stored in the internal of the information processing apparatus 100.

The host CPU 130 controls the respective sections in the information processing apparatus 100. The respective sections in the information processing apparatus 100 are operated by various commands from the host CPU 130. For example, when the host CPU 130 receives input for selecting an input terminal section from a user of the information processing apparatus 100 via the key operating section 132, it supplies a control signal for switching the switch sections 114 and 118 to the switch sections 114 and 118 according to the input. When the host CPU 130 receives the input for selecting a recording medium from a user of the information processing apparatus 100 via the key operating section 132, it transmits a control signal for recording data in the recording medium selected by the user to the media controller 124 according to the input.

In this embodiment, the host CPU 130 detects a deletion block as an entirely free area (namely, continuous free area) and free areas in a deletion block where writing is partially carried out (namely, fragmented free areas). The host CPU 130 instructs the media controller 124 to record data so that the detected free areas are filled with the data.

The key operating section 132 receives an input instruction for operating the information processing apparatus 100 by the user of the information processing apparatus 100. Programs and various data for operating the information processing apparatus 100 are recorded in the ROM 134. The RAM 136 is used as a work area while the information processing apparatus 100 is turned on and is operating. Even when the information processing apparatus 100 is turned off, the nonvolatile memory 138 can retain data and is a rewritable memory. Data which should be retained, even when the information processing apparatus 100 is not turned on, such as setting information and parameters are retained in the nonvolatile memory 138.

The information processing apparatus 100 according to one embodiment of the present invention is described above with reference to FIG. 1. A data recording method using the information processing apparatus 100 according to one embodiment of the present invention is described below.

An input terminal section from which data is input is selected from the input/output terminal 104, the input terminal 108 and the camera block 112 according to an instruction by a user via the key operating section 132 or a connected condition of the input/output section 102. The semiconductor memory 126 or the hard disc 128 into which the input data is to be recorded is selected according to the instruction by the user via the key operating section 132.

For example, when the camera block 112 from which the data is to be input is selected according to the instruction by the user via the key operating section 132, the switch section 114 is switched to the terminal b by a control signal from the host CPU 130. The data acquired by the camera block 112 is input into the encoder/decoder 116.

When the semiconductor memory 126 in which the data is to be recorded is selected according to the instruction by the user via the key operating section 132, FAT information and free area information in the semiconductor memory 126 is recognizes via the media controller 124. The media controller 124 acquires a position in the semiconductor memory 126 in which the data should be recorded based on the FAT information and the free area information.

The data output from the camera block 112 is input into the encoder/decoder 116 via the switch section 114. The encoder/decoder 116 compresses the input data by encoding according to a predetermined encoding system such as MPEG. The data compressed by encoding is stored from the encoder/decoder 116 via the switch section 118 into the buffer 120 by writing control of the host CPU 130.

The data stored in the buffer 120 is read by reading control of the host CPU 130. The data stored in the buffer 120 is read by an FIFO (First In First Out) system, for example.

The data read from the buffer 120 by the reading control of the host CPU 130 is recorded in the semiconductor memory 126 or the hard disc 128 via the switch section 122 and the media controller 124. When data is recorded, the media controller 124 is controlled so that the data is recorded in a recording position which is previously recognized.

When data is recorded in the semiconductor memory 126 or the hard disc 128, the switch section 122 is connected to the terminal a. The switch section 122 is connected to the terminal b periodically, and the host CPU 130 updates the FAT information. Also at the stage where the data recording is completed, the switch section 122 is connected to the terminal b periodically, and the host CPU 130 updates the FAT information and directory entry information.

The information processing apparatus 100 records the input data in the semiconductor memory 126 or the hard disk 128. In this embodiment, when the data is recorded from the media controller 124 into the semiconductor memory 126 or the hard disk 128, a free area present in the semiconductor memory 126 or the hard disk 128 is detected. The data is arranged and recorded so that the fragmentation of the detected free area is repressed, so that useless areas are reduced while the fragmentation is repressed. The data recording system using the information processing apparatus 100 according to this embodiment is described below. The following examples explain the data recording system in a case where data is recorded by the media controller 124 into the semiconductor memory 126.

First Example

FIGS. 2A to 2D are explanatory diagrams explaining the first example of the data recording system using the information processing apparatus 100 according to the embodiment. The numbers in FIGS. 2A to 2D represent numbers of the deletion blocks.

Figure 2A:
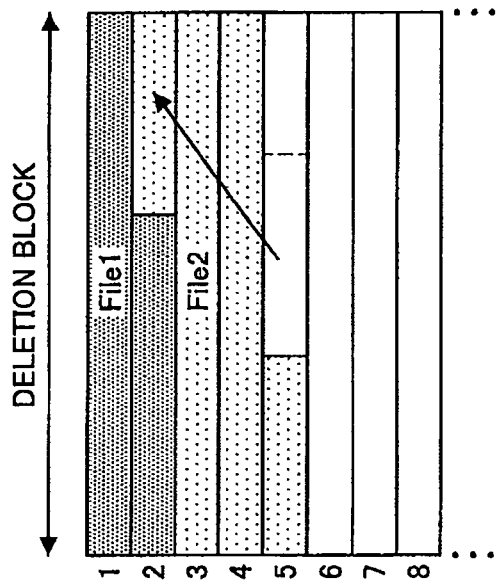
FIG. 2A is an explanatory diagram explaining a first example of a data recording system using the information processing apparatus 100 according to one embodiment of the present invention.

FIG. 2A is an explanatory diagram explaining a case where a file 2 is tried to be recorded by the media controller 124 when a file 1 is recorded in first and second deletion blocks in the semiconductor memory 126. The file 1 is recorded in an entire area of the first deletion block and a partial area of the second deletion block. Therefore, the recordation of the file 2 is started from a third deletion block, and thus an end portion of the second deletion block remains as a useless area in which data are not recorded.

When the file 2 is recorded by the media controller 124, the recordation of the file 2 is started from the head of the third deletion block in the semiconductor memory 126, and when the data recording is completed, a part of the recorded data is moved so that the end portion of the second deletion block where the data is not recorded is filled. In this embodiment, the host CPU 130 detects a free area in the deletion block where the data is recorded, and the host CPU 130 instructs the media controller 124 to record data so as to fill the detected free area in the deletion block.

Figure 2B:
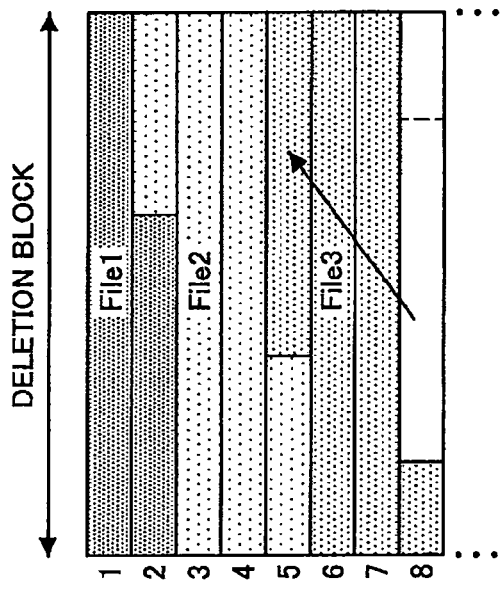
FIG. 2B is an explanatory diagram explaining the first example of the data recording system using the information processing apparatus 100 according to one embodiment of the present invention.

FIG. 2B is an explanatory diagram explaining a case where a part of the data in the file 2 is moved to the end portion of the second deletion block and a useless area in the second deletion block is eliminated. In the case of FIG. 2B, the file 2 is originally recorded in the entire areas of the third and a fourth deletion blocks and a partial area of a fifth deletion block in the semiconductor memory 126.

A part of the data recorded in the fifth deletion block of the semiconductor memory 126 is moved to the end portion of the second deletion block where data are not recorded. When the data are moved, the switch section 122 is connected to the terminal b, and the host CPU 130 updates the FAT information. Moving the data of the file 2 can repress the generation of a useless area in the deletion blocks.

Figure 2C:
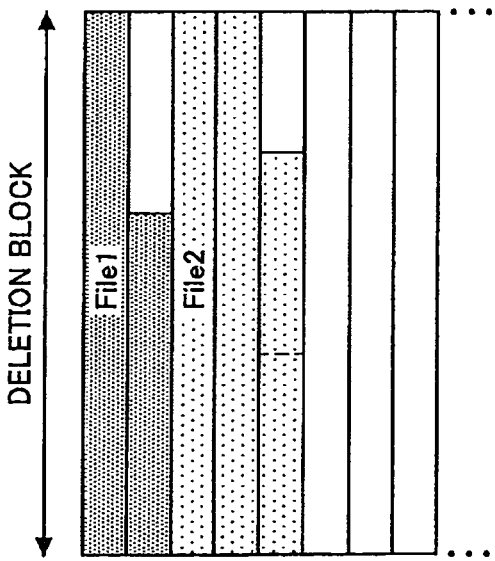
FIG. 2C is an explanatory diagram explaining the first example of the data recording system using the information processing apparatus 100 according to one embodiment of the present invention.

FIG. 2C is an explanatory diagram explaining a case where a file 3 is tried to be newly recorded in the semiconductor memory 126. As shown in FIG. 2C, since the file 2 is recorded in a partial area of a fifth deletion block in the semiconductor memory 126, the recordation of the file 3 is started from the head of a completely free sixth deletion block in order to record at a high speed. Similarly to the file 2, when the data recording is completed, a part of the recorded data is moved so as to fill the end portion of the fifth deletion block where data is not recorded.

Figure 2D:
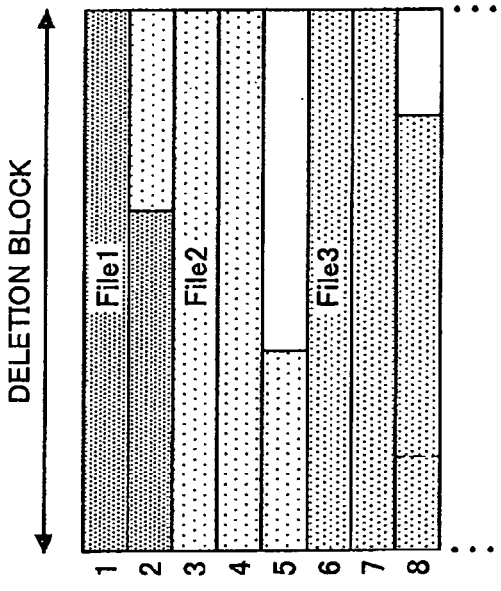
FIG. 2D is an explanatory diagram explaining the first example of the data recording system using the information processing apparatus 100 according to one embodiment of the present invention.

FIG. 2D is an explanatory diagram explaining a case where a part of the data in the file 3 to be recorded in the semiconductor memory 126 is moved to the end portion of the fifth deletion block so that a useless area of the fifth deletion block is eliminated. In the case of FIG. 2D, the file 3 is originally recorded in the entire areas of sixth and seventh deletion blocks in the semiconductor memory 126 and a partial area of the fifth deletion block.

The end portion of the data recorded in an eighth deletion block in the semiconductor memory 126 is moved to the end portion of the fifth deletion block where data is not recorded.

When the data is moved, the switch section 122 is connected to the terminal b, so that the host CPU 130 updates the FAT information. By moving the data of the file 3, the generation of useless areas of the deletion blocks in the semiconductor memory 126 can be repressed. The data is fragmented by moving the data, but the size of the fragmented portion does not exceed the size of the deletion block at most, and the positions of the files can be obtained accurately by the updating of the FAT information. Since the moving process is executed after the recording is completed, this process does not cause a failure of the recordation in the recording medium in time. When data is read, fragmented data is read, but the load of fragmentation at the time of reading is generally more minor than the load of the fragmentation at the time of writing in flash memory, so that its influence of the load is small.

According to the first example, by moving the end portion of data to a free area in a deletion block where writing is partially carried out, the generation of a useless area is repressed, and a partially free deletion block is eliminated, so that the number of completely free deletion blocks can be increased.

Second Example

FIGS. 3A to 3E are explanatory diagrams explaining a second example of the data recording system using the information processing apparatus 100 according to one embodiment of the present invention. Also in FIGS. 3A to 3E, similarly to FIGS. 2A to 2D, numbers in FIGS. 3A to 3E represent the numbers of the deletion blocks.

In the second example, the following data recording system is described. In this system, before data is recorded as a file via the media controller 124 in the semiconductor memory 126, the data are once buffered, and the buffered data is recorded in the semiconductor memory 126 so as to fill a free area of the deletion blocks having partial free areas.

Figure 3A:
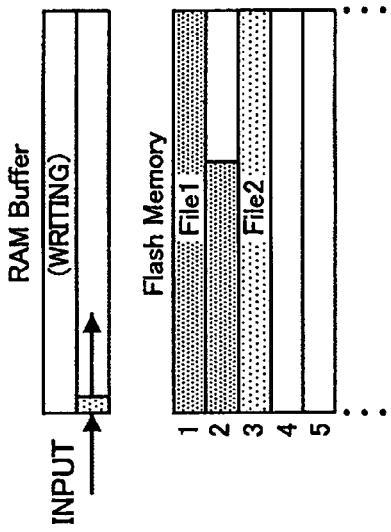
FIG. 3A is an explanatory diagram explaining a second example of a data recording system using the information processing apparatus 100 according to one embodiment of the present invention.

FIG. 3A is an explanatory diagram explaining a case where the file 2 is tried to be recorded when the file 1 is recorded in the first and second deletion blocks of the semiconductor memory 126. The file 1 is recorded in the entire area of the first deletion block and a partial area of the second deletion block. Accordingly, when the file 2 is tried to be recorded directly in the semiconductor memory 126, the recordation of the file 2 is started from the completely free third deletion block. As a result, the end portion of the second deletion block remains unrecorded, which is completely free, so that it turns into a useless area.

As shown in FIG. 3A, before data is recorded in the semiconductor memory 126, the data of the file 2 to be recorded in the semiconductor memory 126 is temporarily buffered in the RAM 136 as one example of a data storage section according to one embodiment of the present invention. A buffer area in which the data is buffered desirably has the same size as the size of the deletion block of the semiconductor memory 126. Two buffer areas may be provided as shown in FIG. 3A.

Figure 3B:
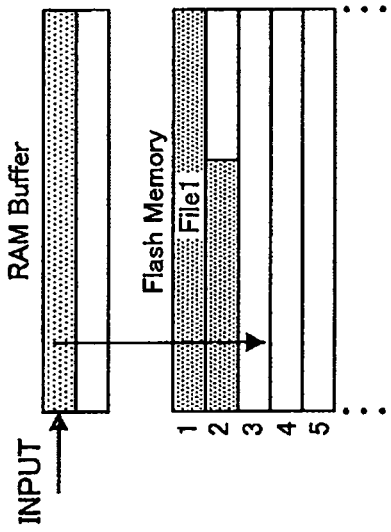
FIG. 3B is an explanatory diagram explaining the second example of the data recording system using the information processing apparatus 100 according to one embodiment of the present invention.
Figure 3C:
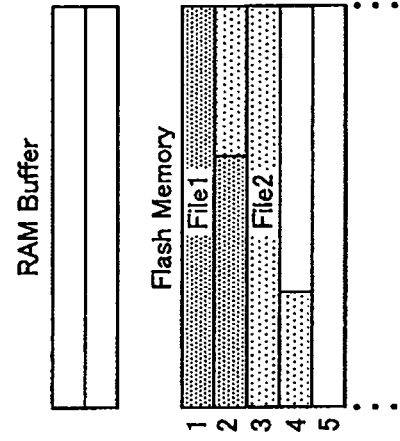
FIG. 3C is an explanatory diagram explaining the second example of the data recording system using the information processing apparatus 100 according to one embodiment of the present invention.

As shown in FIG. 3B, when a first buffer area of the RAM 136 is filled with data, as shown in FIG. 3C, those data are moved to the third deletion block of the semiconductor memory 126, and the data of the file 2 is buffered in a second buffer area of the RAM 136.

Figure 3D:
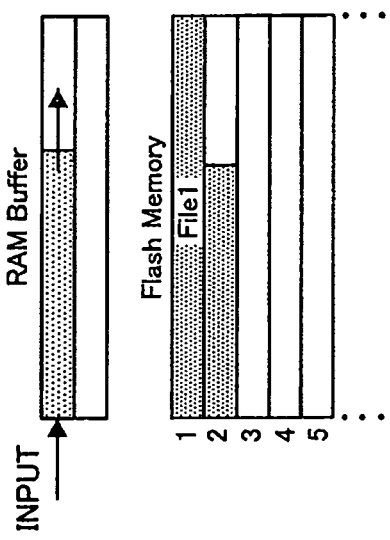
FIG. 3D is an explanatory diagram explaining the second example of the data recording system using the information processing apparatus 100 according to one embodiment of the present invention.

Thereafter, when the input of the data of the file 2 into the RAM 136 is completed as shown in FIG. 3D, the data is moved from the head of the second buffer area in the RAM 136 to the second deletion block in the semiconductor memory 126 having a partial free area. The residual data is moved to the fourth deletion block in the semiconductor memory 126.

Figure 3E:
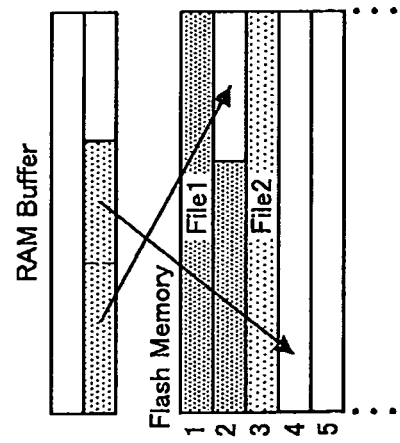
FIG. 3E is an explanatory diagram explaining the second example of the data recording system using the information processing apparatus 100 according to one embodiment of the present invention.

As shown in FIG. 3E, by moving the data buffered in the second buffer area of the RAM 136 so as to fill the free area of the deletion block, the generation of a useless area of the deletion block can be repressed. As a result, a partially free deletion block is eliminated, and the number of completely free deletion blocks can be increased.

The examples where the two buffer areas are provided is described with reference to FIGS. 3A to 3E, but the present invention is not limited to these examples, and thus one buffer area may be provided as long as data can be copied from a buffer area for fairly short time. Three or more buffer areas may be provided, or the buffer area may have an FIFO (First In First Out) structure. The buffer area where data is buffered may be provided not to the RAM 136 but to the buffer 120. The buffer area may be provided in the inside of the semiconductor memory 126. When the buffer area is provided into the semiconductor memory 126, implementing of a main body of the information processing apparatus 100 becomes easy.

As described above, according to the second example, before data is recorded, the data is buffered in the buffer area, and the end portion of the buffered data is moved to a free area of the deletion block where writing is partially carried out. As a result, the generation of useless areas can be repressed, a partially free deletion block can be eliminated, and the number of completely free deletion blocks can be increased.

In the second example, as shown in FIG. 3D, data is moved from the head of the buffer area in the RAM 136 to the deletion block where a free area is partially present, and residual data is moved to the deletion block where data is not recorded. However, whether to start moving, from the head or tail of the buffer area, may be reversed.

Third Example

A third example describes the data recording system at the time of recording a plurality of files composing video or audio clip.

Figure 4A:
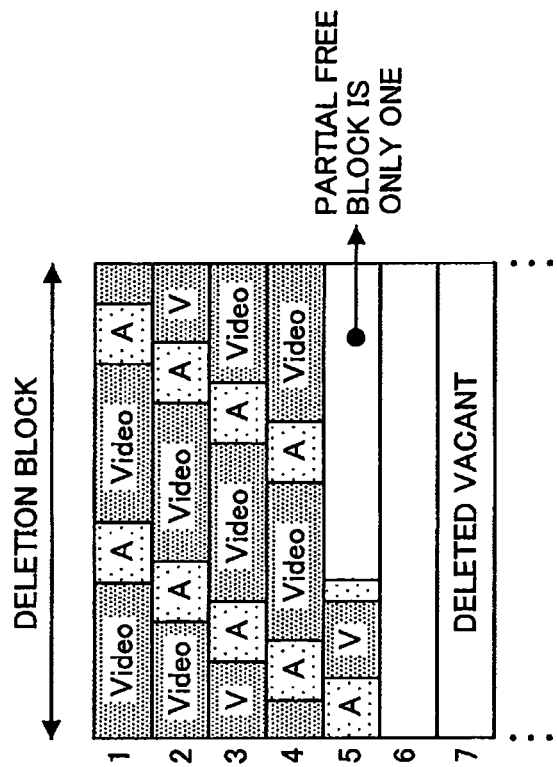
FIG. 4A is an explanatory diagram explaining a third example of a data recording system using the information processing apparatus 100 according to one embodiment of the present invention.
Figure 4B:
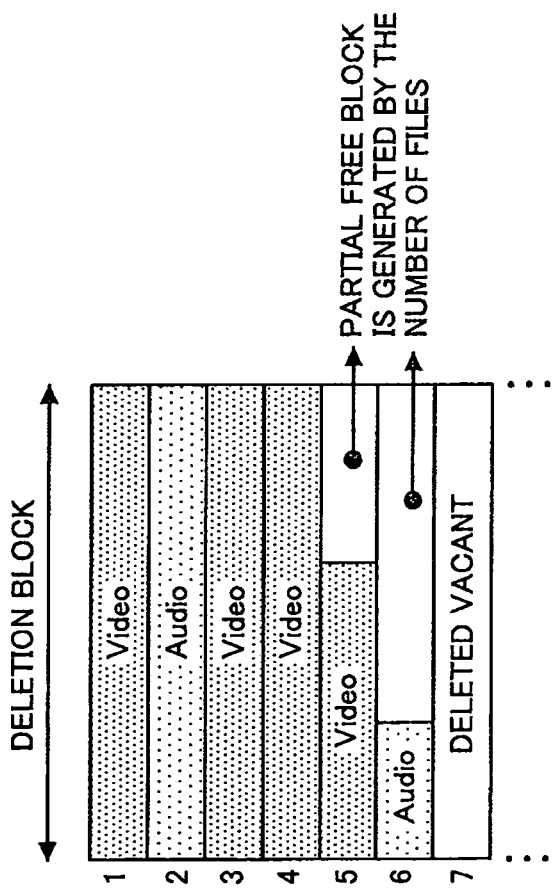
FIG. 4B is an explanatory diagram explaining the third example of the data recording system using the information processing apparatus 100 according to one embodiment of the present invention.

FIGS. 4A and 4B are explanatory diagram explaining the third example of the data recording system using the information processing apparatus 100 according to one embodiment of the present invention. Also in FIGS. 4A and 4B, similarly to FIGS. 2A to 2D and FIGS. 3A to 3E, numbers in FIGS. 4A and 4B represent the numbers of the deletion blocks.

FIG. 4A is an explanatory diagram explaining a past recording system, and it explains a case where video data (in FIG. 4A, referred to as "Video") and audio data (in FIG. 4A, referred to as "Audio") are respectively recorded in the semiconductor memory 126 in unit of file including a plurality of collected clips. There are some examples of data where a file is divided and recorded, such as low resolution data, real time metadata and the like. As shown in FIG. 4A, when data is recorded in the semiconductor memory 126 in unit of file, a free area may occur in a deletion block for the file corresponding to the video data and the file corresponding to the audio, respectively.

In the third example of this embodiment, therefore, data are allocated to the semiconductor memory 126 not in unit of file but in unit of clip so as to be recorded, so that the generation of free areas is repressed. The third example of this embodiment describes a case where when video data and audio data are respectively created as different files, the data are allocated to the semiconductor memory 126 not in unit of file but in unit of clip so as to be recorded.

FIG. 4B is an explanatory diagram explaining a case where data is recorded in the semiconductor memory 126 in unit of clip according to the third example of this embodiment. FIG. 4B illustrates a case where video data (referred to as "Video" or "V") and audio data (referred to as "A") are recorded sequentially in the semiconductor memory.

For example, when the encoder/decoder 116 encodes data according to the MPEG system, since video data is generated in every 0.5 second, and the video data are aligned in unit of cluster. Also, audio data is divided in unit of integral multiple of the cluster. Both the video data and audio data are recorded in the semiconductor memory 126 every time when the data of cluster unit are generated. Like the first example or the second example, when the data is recorded, the end portion of the data is moved to a free area in the deletion block where writing is partially carried out at the time of completion of the recording so as to be recorded therein.

As described above, according to the third example, when low resolution data and real time metadata are recorded, the data are allocated to the semiconductor memory 126 not in unit of file but in unit of clip so as to be recorded. By recording data so as to fill a free area of the deletion block where writing is partially carried out, the generation of useless areas in the deletion block can be repressed. As a result, a partially free deletion block can be eliminated, and the number of completely free deletion blocks can be increased.

When interleaving video data and audio data, by respectively aligning the video data and audio data with apparent page size, which means, by setting the cluster size as the apparent page size, the file composing the video data and the file composing audio data can be stored separately. As a result, reading the files can be achieved with a high speed.

Fourth Example

A fourth example describes a data recording system for recording a plurality of files composing the video and audio clips and data attached to the clips (for example, non real time data).

Figure 5:
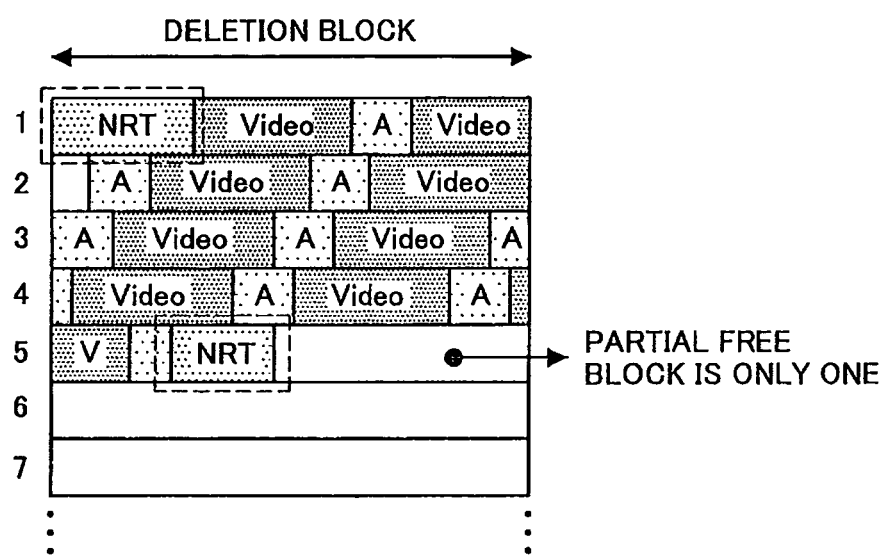
FIG. 5 is an explanatory diagram explaining a fourth example of a data recording system using the information processing apparatus 100 according to one embodiment of the present invention.
Figure 6:
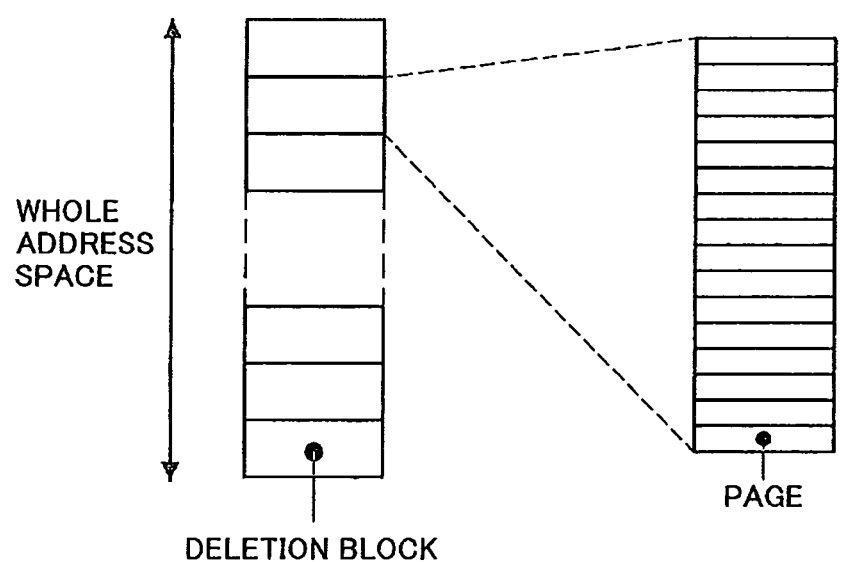
FIG. 6 is an explanatory diagram explaining a relationship between a deletion block and a page in a flash memory.
Figure 8B:
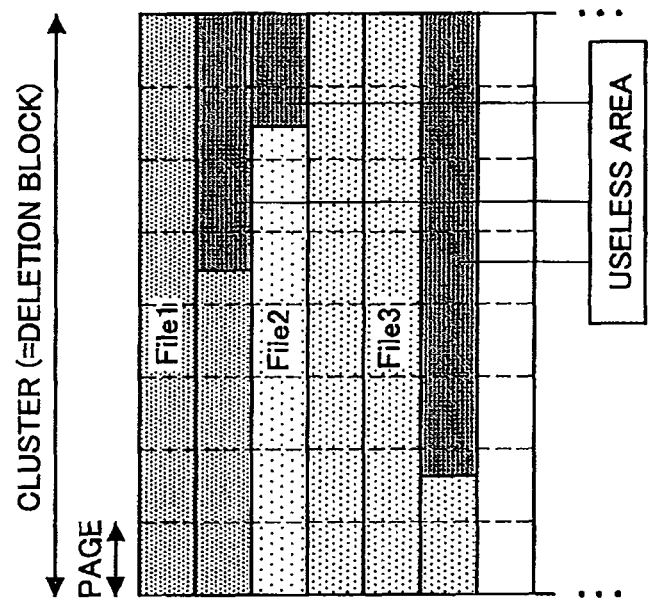
FIG. 8B is an explanatory diagram explaining recording of data in a past flash memory.
Figure 8A:
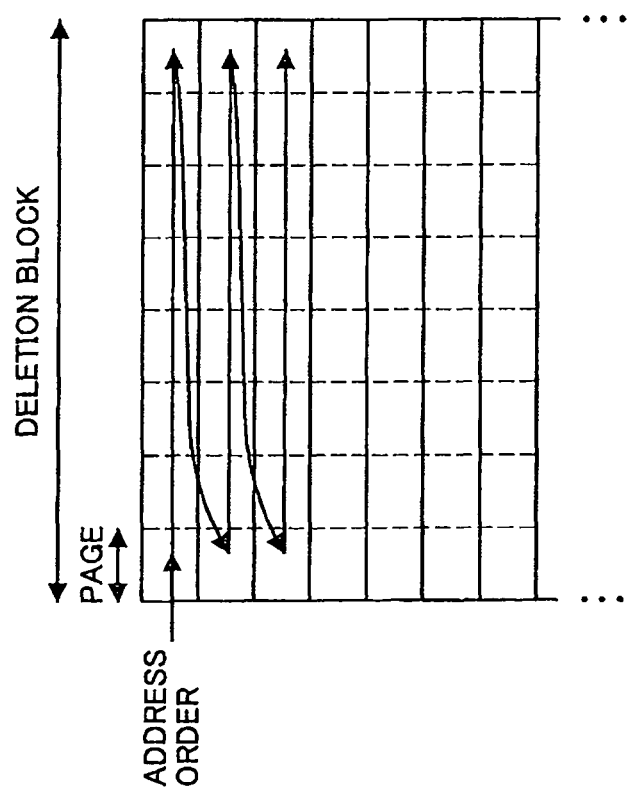
FIG. 8A is an explanatory diagram explaining recording of data in a past flash memory.

FIG. 5 is an explanatory diagram explaining the fourth example of the data recording system using the information processing apparatus 100 according to one embodiment of the present invention. FIG. 5 illustrates a case where video data (referred to as "Video" or "V") and audio data (referred to as "A") are sequentially recorded in the semiconductor memory 126. Also in FIG. 5, similarly to FIGS. 2A to 4B, numbers in FIG. 5 represent the numbers of the deletion blocks.

In the fourth example, similarly to the third example, data is allocated to the semiconductor memory 126 not in unit of file but in unit of clip and is recorded therein, so that the generation of free areas is repressed. The fourth example of the embodiment describes a case where when video data and audio data, and data generated accompanied with clips are respectively created as different files, data are recorded in the semiconductor memory 126. In this example, as an example of the data generated accompanied with clips, non real time data (in FIG. 5, referred to as "NRT") is described.

As shown in FIG. 5, the non real time data defined at the time of starting recordation is allocated and recorded before the data generated in real time. When the non real time data is recorded in the semiconductor memory 126, thereafter video and audio data (real time data) are sequentially recorded.

The non real time data defined at the time of completing the recordation of the real time data are recorded continuously after the end of the real time data. When both the real time data and non real time data are recorded in the semiconductor memory 126, like the first example or the second example, their end portions are moved to free areas in deletion blocks where writing is partially carried out so as to be recorded therein.

As described above, according to the fourth example, like the low resolution data and the real time data, when a plurality of files composing video and audio clips and data attached to the clips are recorded, the data are recorded in the semiconductor memory 126 not in unit of file but in unit of clip. When the data are recorded, the data attached to the clips are allocated and recorded continuously with the clips. Owing to such recording, the generation of useless areas can be repressed, partially free deletion blocks can be eliminated, and the number of completely free deletion blocks can be increased. When the recorded data is deleted, the plurality of files composing the audio and video clips and the data attached to the clips are deleted simultaneously. For this reason, generation of fragment can be prevented.

The four examples of the data recording system for recording data in the semiconductor memory 126 are described above. According to the embodiment as described above, when data is recorded in the semiconductor memory 126, data is allocated and recorded so that a fragmentation of free areas is repressed. As a result, while the fragmentation of the semiconductor memory 126 is being repressed, useless areas can be reduced. The reduction in recording capacity and the recording rate of the semiconductor memory 126 can be lightened.

It should be understood by those skilled in the art that various modifications, combinations, sub-combinations and alterations may occur depending on design requirements and other factors insofar as they are within the scope of the appended claims or the equivalents thereof.

For example, the above embodiment explains the case where data is recorded in the semiconductor memory 126, but the present invention is not limited to this example. For example, also when data is recorded in the hard disc 128, the data recording method according to the embodiment of the present invention may be applied. The hard disc does not have concept of the deletion blocks and the pages unlike the flash memory, but they are similar in that an access to continuous free areas is faster than an access to fragmented free areas. Therefore, the deletion blocks and the free areas in the deletion blocks where writing is partially carried out in the embodiment are replaced by continuous free areas and fragmented free areas, so that the above embodiment can be applied to the hard disc.

What is claimed is:

1. An information processing apparatus which records data in a flash memory, comprising:
    a recording section which records data in the flash memory;
    a detecting section which detects continuous free areas or fragmented free areas in a deletion block of the flash memory; and
    a recording control section which controls the recording section to successively record data in the continuous free areas of the flash memory detected by the detecting section, and at the time point when the recording is completed, the recording control section moves an end portion of the recorded data to the fragmented free area of the flash memory detected by the detecting section so that the data is contained within the free area so as to record the data,
    wherein after the data is moved to the fragmented free areas of the flash memory a file allocation table of the flash memory is updated according to the move,
    wherein the data includes real time data and non real time data, non real time data defined at the time that recording of the real time data is started is recorded continuously before the start of the real time data, non real time data defined at the time that recording of the real time data is completed is recorded continuously after the end of the real time data, and the recorded data which is moved includes both real time data and non real time data.

2. The information processing apparatus according to claim 1, wherein
    the data to be recorded in the flash memory is video and audio data,
    the recording section allocates the video and audio data to the flash memory so as to record the video and audio data.

3. The information processing apparatus according to claim 2, wherein the recording section allocates data defined at the time of starting the recordation just before the video and audio data so as to record the video and audio data, and allocates data defined at the time of completing the recordation just after the video and audio data so as to record the video and audio data.

4. An information processing apparatus which records data in a flash memory, comprising:
    a recording section which records data in the flash memory;
    a data storage section which temporarily stores the data to be recorded in the flash memory therein before the recording section records the data in the flash memory;
    a detecting section which detects continuous free areas or fragmented free areas in deletion block of the flash memory; and
    a recording control section which controls the recording section so that the recording section sequentially moves the data stored in the data storage section to the continuous free areas of the flash memory detected by the detecting section so as to record the data during normal recording, and moves only an end portion of the recording data stored in the data storage section to the fragmented free areas of the flash memory detected by the detecting section so as to record the data,
    wherein after the data is moved to the fragmented free areas of the flash memory a file allocation table of the flash memory is updated according to the move,
    wherein the data includes real time data and non real time data, non real time data defined at the time that recording of the real time data is started is recorded continuously before the start of the real time data, non real time data defined at the time that recording of the real time data is completed is recorded continuously after the end of the real time data, and the recorded data which is moved includes both real time data and non real time data.

5. The information processing apparatus according to claim 4 wherein
    the data to be recorded in the flash memory is video and audio data,
    the recording control section controls the recording section so that the recording section allocates the video and audio data to the flash memory so as to record the video and audio data.

6. The information processing apparatus according to claim 4, wherein the recording section allocates data defined at the time of starting the recordation just before the video and audio data so as to record the video and audio data, and allocates data defined at the time of completing the recordation just after the video and audio data so as to record the video and audio data.

7. The information processing apparatus according to claim 4, wherein the data storage section includes at least one data storage block having the same capacity as an efficient rewriting unit of the flash memory.

8. The information processing apparatus according to claim 4, wherein the data storage section stores data in unit of page as minimum reading/writing unit of the flash memory.

9. The information processing apparatus according to claim 4, wherein the data storage section is included in the flash memory.

10. A recording method for recording data in a flash memory, comprising the steps of:
 detecting continuous free areas or fragmented free areas in deletion block of the flash memory;
 controlling the recordation so that data is recorded sequentially in the continuous free areas of the flash memory detected at the detecting step, and at the time point when the recording is completed, an end portion of the recorded data is moved to the fragmented free areas of the flash memory detected at the detecting step so as to be recorded; and
 recording data in the flash memory according to the control at the recordation controlling step,
 wherein after the data is moved to the fragmented free areas of the flash memory a file allocation table of the flash memory is updated according to the move,
 wherein the data includes real time data and non real time data, non real time data defined at the time that recording of the real time data is started is recorded continuously before the start of the real time data, non real time data defined at the time that recording of the real time data is completed is recorded continuously after the end of the real time data, and the recorded data which is moved includes both real time data and non real time data.

11. A recording method for recording data in a flash memory, comprising the steps of:
 temporarily storing data to be recorded in the flash memory before the data is recorded in the flash memory;
 detecting continuous or fragmented free areas in deletion block of the flash memory;
 flash memory detected at the detecting step so as to be recorded in the continuous free areas of the flash memory detected at the detecting step during normal recording, and only an end portion of the recording data stored at the data storing step is moved to the fragmented free areas of the flash memory detected at the detecting step so that the data can be contained within the free area so as to be recorded; and
 recording data in the flash memory according to the control at the recordation controlling step,
 wherein after the data is moved to the fragmented free areas of the flash memory a file allocation table of the flash memory is updated according to the move,
 wherein the data includes real time data and non real time data, non real time data defined at the time that recording of the real time data is started is recorded continuously before the start of the real time data, non real time data defined at the time that recording of the real time data is completed is recorded continuously after the end of the real time data, and the recorded data which is moved includes both real time data and non real time data.

12. A non-transitory computer-readable medium having stored thereon a computer program which causes a computer to execute a process of recording data in a flash memory, the process comprising the steps of:
 detecting continuous free areas or fragmented free areas in deletion block of the flash memory;
 controlling the recordation so that data is recorded sequentially in the continuous free areas of the flash memory detected at the detecting step, and at the time point when the recording is completed, an end portion of the recorded data is moved to the fragmented free areas of the flash memory detected at the detecting step so as to be recorded; and
 recording data in the flash memory according to the control at the recordation controlling step,
 wherein after the data is moved to the fragmented free areas of the flash memory a file allocation table of the flash memory is updated according to the move,
 wherein the data includes real time data and non real time data, non real time data defined at the time that recording of the real time data is started is recorded continuously before the start of the real time data, non real time data defined at the time that recording of the real time data is completed is recorded continuously after the end of the real time data, and the recorded data which is moved includes both real time data and non real time data.

13. A non-transitory computer-readable medium having stored thereon a computer program which causes a computer to execute a process of recording data in a flash memory, the process comprising the steps of:
 temporarily storing data to be recorded in the flash memory before recording the data in the flash memory;
 detecting continuous or fragmented free areas in deletion block of the flash memory;
 controlling the recordation so that the data stored in the data storing step are sequentially moved to the continuous free areas of the flash memory detected at the detecting step so as to be recorded during normal recording, and only an end portion of the data stored at the data storing step is moved to the fragmented free areas of the flash memory detected at the detecting step so as to be recorded; and
 recording data in the flash memory according to the control at the recordation controlling step,
 wherein after the data is moved to the fragmented free areas of the flash memory a file allocation table of the flash memory is updated according to the move,
 wherein the data includes real time data and non real time data, non real time data defined at the time that recording of the real time data is started is recorded continuously before the start of the real time data, non real time data defined at the time that recording of the real time data is completed is recorded continuously after the end of the real time data, and the recorded data which is moved includes both real time data and non real time data.

* * * * *